United States Patent [19]

Kunitake

[11] Patent Number: 5,692,074

[45] Date of Patent: Nov. 25, 1997

[54] IMAGE INFORMATION CODING DEVICE AND IMAGE INFORMATION COMMUNICATION DEVICE WITH BLOCK AVERAGE INFORMATION AND CONTROLLABLE COMPRESSION

[75] Inventor: Setsu Kunitake, Kanagawa, Japan

[73] Assignee: Fuji Xerox Co., Ltd., Tokyo, Japan

[21] Appl. No.: 424,628

[22] Filed: Apr. 19, 1995

[30] Foreign Application Priority Data

Sep. 7, 1994 [JP] Japan .................................. 6-213393

[51] Int. Cl.⁶ .................................................. G06K 9/36
[52] U.S. Cl. ........................................ 382/239; 358/430
[58] Field of Search .............................. 382/248, 250, 382/251, 235, 239; 358/432, 433, 430; 348/405, 404, 419, 421

[56] References Cited

U.S. PATENT DOCUMENTS

| | | | |
|---|---|---|---|
| 4,920,426 | 4/1990 | Hatori et al. | 358/433 |
| 5,027,214 | 6/1991 | Eujimori | 358/209 |
| 5,249,053 | 9/1993 | Jain | 358/209 |
| 5,321,522 | 6/1994 | Eschbach | 358/433 |
| 5,339,368 | 8/1994 | Higgins-Luthman et al. | 382/56 |
| 5,412,484 | 5/1995 | Yoshikawa | 358/433 |
| 5,432,870 | 7/1995 | Schwartz | 382/232 |
| 5,543,844 | 8/1996 | Mita et al. | 348/405 |

FOREIGN PATENT DOCUMENTS 5-268480  10/1993  Japan .............................. H04N 1/41

OTHER PUBLICATIONS

Application/Computer: Video Compression Makes Big Gains, Oct. 1991, vol. 28, Issue 10 Rengh Ang, Peter A. Ruetz, David Auld.

English Translation of Japanese Kokai No. 5-268480 to Honda et al., Oct. 1993.

"International Standard for Multimedia Coding", Yasuda, pp. 14-47, (1991).

"Bit Rate Control Method for DCT Image Coding", K. Nemoto et al., Proceedings of the IEICE Fall Conference, D-45, 1989.

*Primary Examiner*—Andrew Johns
*Attorney, Agent, or Firm*—Finnegan, Henderson, Farabow, Garrett & Dunner, L.L.P.

[57] ABSTRACT

Input image information is divided into blocks each consisting of N×N pixels (N: positive integer) by a blocking section to obtain blocked image information. The blocked image information is coded by a coding section. At this time, a coding parameter used in the coding section is estimated by a code amount control section, and the coding section repeats coding plural times until the amount of coded information reaches a target code amount. Then, the coding parameter attaining the target code amount is set into the coding section to perform final coding and output final coded information. In the coding process, a block average as the average of the blocked image information in each block is calculated in any cycle of repetition of coding other than the final cycle. By the use of this block average, an image showing the approximation of the image information can be generated. Accordingly, the approximation of the image information can be output at high speeds, and the generation of the image showing the approximation of the image information can be efficiently performed.

4 Claims, 5 Drawing Sheets

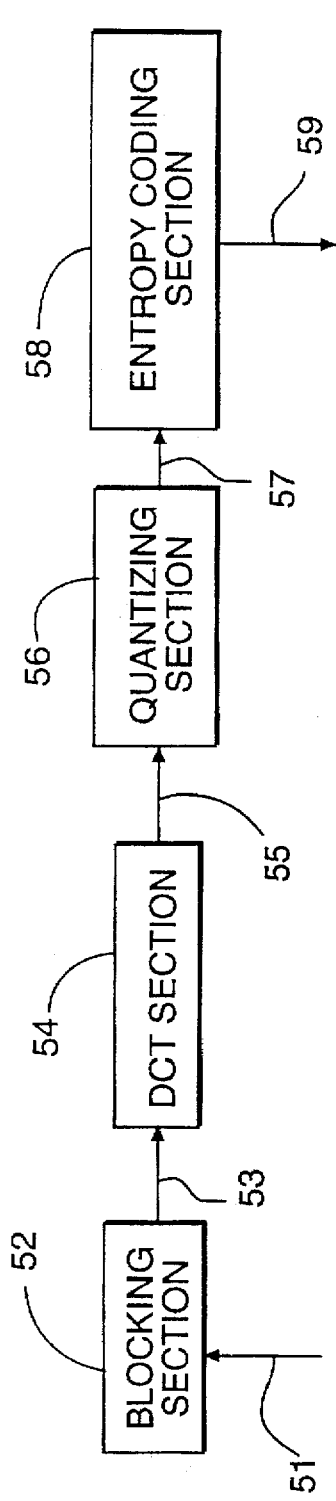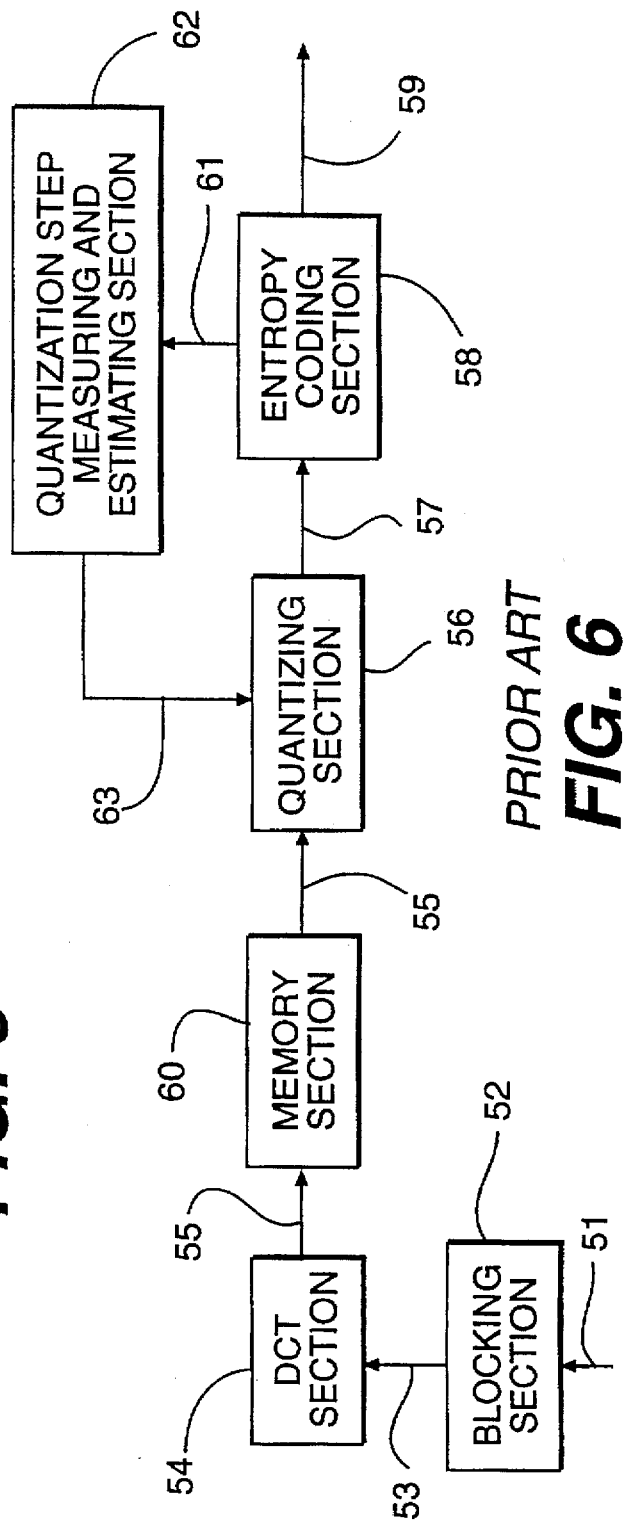

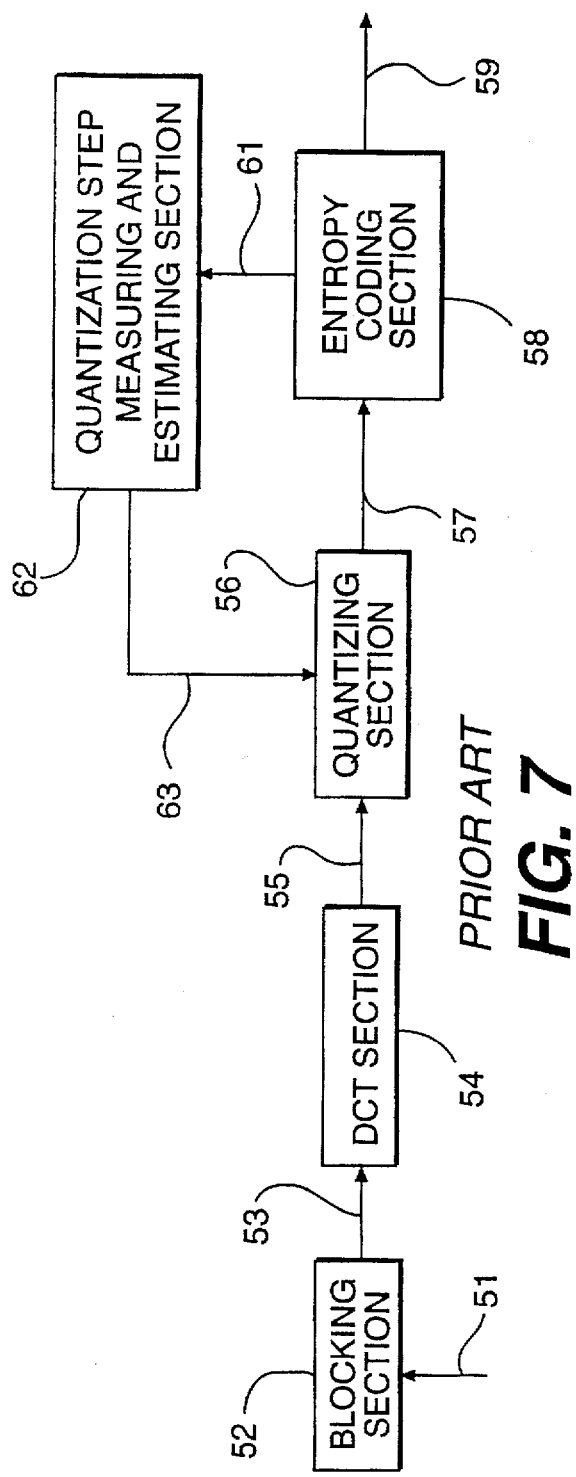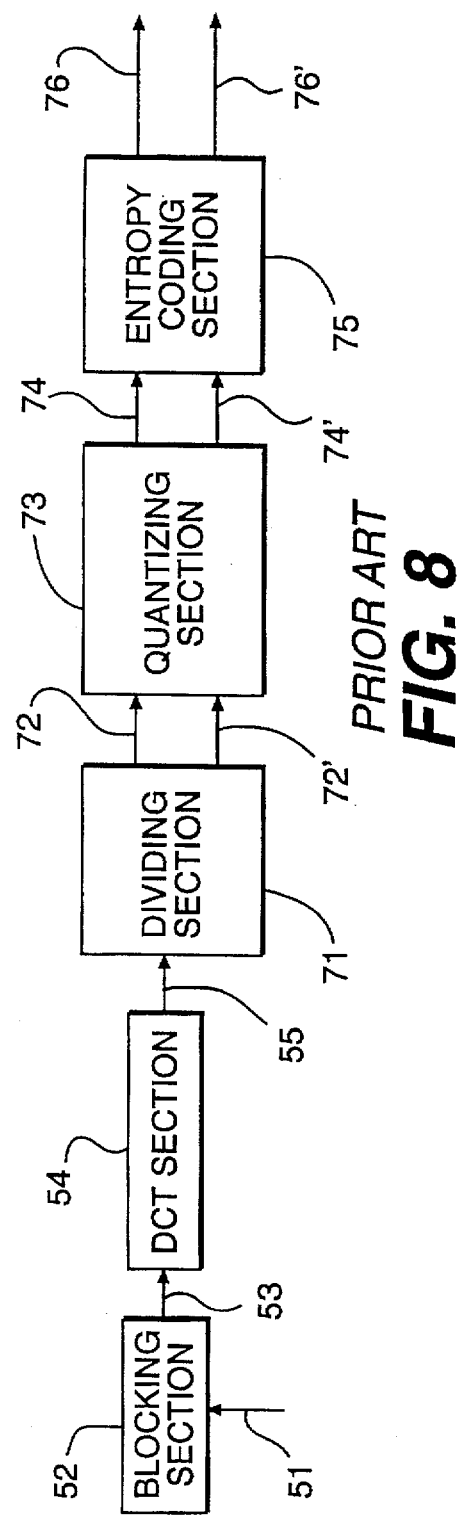

IMAGE INFORMATION CODING DEVICE AND IMAGE INFORMATION COMMUNICATION DEVICE WITH BLOCK AVERAGE INFORMATION AND CONTROLLABLE COMPRESSION

BACKGROUND OF THE INVENTION

1. Field of the Invention

The present invention relates to an image information coding device for performing variable length coding of digital image information as performing code amount control, and also to an image information communicating device for transmitting the image information coded by the image information coding device.

2. Description of the Related Art

Conventionally, a large amount of digital image information is collectively stored and it is used as a database. In this case, high-efficiency coding is applied to the image information to be stored, so as to reduce the amount of data to be stored.

A coding method for image information is classified into fixed length coding whereby a code amount becomes always constant and variable length coding whereby a code amount varies according to an image. In general, the fixed length coding is often inferior to the variable length coding in coding efficiency. Accordingly, the variable length coding is often applied to a database or the like.

The variable length coding is also adopted in the JPEG (Joint Photographic coding Experts Group) system as an international standard system for still picture coding, for example. A coder/decoder using the JPEG system is now easily available in the market, and therefore coded information in the format conforming with the JPEG system is used everywhere through a network.

FIG. 5 is a block diagram showing the configuration of a coder in accordance with the JPEG system. In FIG. 5, there are shown an input image 51, blocking section 52, blocked image information 53, DCT (Discrete Cosine Transform) section 54, transform coefficient 55, quantizing section 56, quantized transform coefficient 57, entropy coding section 58, and coded information 59. The input image 51 is divided into blocks each consisting of N×N pixels (N: positive integer) by the blocking section 52 to obtain the blocked image information 53, which is then input into the DCT section 54. The DCT section 54 performs DCT to the blocked image information 53 to obtain the transform coefficient 55, which is in turn input into the quantizing section 56. The quantizing section 56 quantizes the transform coefficient 55 to obtain the quantized transform coefficient 57, which is in turn input into the entropy coding section 58. The entropy coding section 58 codes the quantized transform coefficient 57 to output the coded information 59.

The variable length coding has problems such that a code amount is not constant and a high compression rate cannot be attained depending on an input image or a coding parameter, because the characteristics of the input image are reflected on a coding efficiency. In some case, a database is used from a remote terminal through a transmission line. Therefore, also from the viewpoints of a transmission time and charge, it is desirable to code the input image at a constant compression rate regardless of the characteristics of the input image. In these circumstances, a control method called code amount control for controlling a compression rate is used in the variable length coding.

For example, such a code amount control method is described in "Code Amount Control Method in DCT Coding System", Great Autumn National Meeting Proceedings D-45, pp. 6–45 of Electronic Information & Communication Society, 1989. The method described in this literature is a code amount control method for a coder employing an algorithm similar to that of the JPEG system.

FIG. 6 is a block diagram showing a coder using a code amount control method in the related art. Elements shown in FIG. 6 similar to those shown in FIG. 5 are denoted by the same reference numerals, and the explanation thereof will be omitted herein. In FIG. 6, there are shown a memory section 60, code amount 61, quantization step measuring and estimating section 62, and quantization step value 63. An input image 51 is divided into blocks each consisting of N×N pixels by a blocking section 52 to obtain blocked image information 53, which is then transformed into a transform coefficient 55 by a DCT section 54. The transform coefficient 55 is stored into the memory section 60. The transform coefficient 55 read from the memory section 60 is quantized in a quantizing section 56 to obtain a quantized transform coefficient 57, which is in turn coded by an entropy coding section 58. At this time, the code amount 61 is input into the quantization step measuring and estimating section 62. The coding operation is repeatedly performed by using a plurality of different quantization step values. The quantization step herein referred to is one of the coding parameters in this coding method, and it is used in quantization to be performed by the quantizing section 56.

The quantization step measuring and estimating section 62 estimates the quantization step value 63 for attaining a target code amount from the code amount 61 obtained by the repeated coding operation. The quantization step value 63 thus estimated is set into the quantizing section 56 to perform coding again in the entropy coding section 58. Such cyclic operation may be further repeated to thereby allow higher precision estimation.

FIG. 7 is a block diagram showing another coder using a code amount control method in the related art. The same reference numerals as those in FIG. 6 denotes similar elements. In the case where a storage device for storing image information is provided outside the coder, the configuration of the coder shown in FIG. 7 may be made by excluding the memory section 60 from the coder shown in FIG. 6. In the configuration shown in FIG. 7, image information is read from the storage device with required frequencies and is input into the coder, then performing coding plural times and estimating a quantization step value 63 in the quantization step measuring and estimating section 62. The quantization step value 63 thus estimated is set into a quantizing section 56 to perform coding in an entropy coding section 58, thereby attaining a code amount equal to or less than a target code amount.

However, in the coder using such a code amount control method as shown in FIG. 6 or 7, the coding process is repeated several times until the quantization step is estimated. Accordingly, much time is required until the coding is completed.

In decoding the image information stored in a database, a decoding time has an influence on the time of use of the database by a user, and therefore the decoding time is considered important. However, a coding time in coding the image information to be stored into the database is usually unrelated to the user performing the retrieval of information, that is, the user has no concern about the coding time. Accordingly, in storing the image information into the database, even the code amount control method performing coding plural times as shown in FIG. 6 or 7 can be applied.

Conversely, it is desirable to minimize a data amount by using the code amount control method as mentioned above.

A function to be required in using a database will now be considered. In using the database, it is necessary to quickly retrieve the contents of coded image information from the database and confirm them, then obtaining a desired piece of image information in a short time. However, in a decoding technique at present, much time is required for decoding. Accordingly, a great deal of time is consumed until all pieces of image information are decoded and the contents of them are confirmed. Further, in using the database from remote terminals, all pieces of coded information must be once transferred to each terminal, causing a problem in transfer cost and time. In these circumstances, it is desirable that the contents of the code information can be confirmed prior to decoding the coded information. That is, the function to be required in using the database is desired to include a preview function.

Such a preview function may be attained, for example, by detecting only a DC component of a discrete cosine transform coefficient from image information coded by the JPEG system, decoding the DC component detected, and displaying it. Assuming that the size of each block is 8×8, DCT is given by Eq. 1.

$$F(u,v) = \frac{1}{4} C(u)C(v) \sum_{x=0}^{7} \sum_{y=0}^{7} f(x,y) \cos \frac{\pi(2x+1)u}{16} \cos \frac{\pi(2y+1)v}{16} \quad \text{Eq. (1)}$$

$$C(u) = \begin{cases} \frac{1}{\sqrt{2}} & (u=0) \\ 1 & (u \neq 0) \end{cases}, \quad C(v) = \begin{cases} \frac{1}{\sqrt{2}} & (v=0) \\ 1 & (v \neq 0) \end{cases}$$

In Eq. (1), f(x,y) represents each element of the blocked image information 53, and x and y represent a position of each element. F(u,v) represents each element of the discrete cosine transform coefficient 55, and u and v represent a position of each element.

The DC component of the transform coefficient can be obtained by substituting zero for u and v in Eq. (1). It becomes apparent that the value of the DC component obtained above is eight times the average of image information in each block. Accordingly, the average density of image information in each block can be obtained by decoding only the DC component and then dividing the value of the DC component by eight. Then, the approximation of the coded image can be known by imaging the average density obtained above.

Although such a method allows previewing of the coded image, it is necessary to once read all pieces of coded information in performing the previewing. Accordingly, the time period from the instance of reading the coded information from a storage device to the instance of obtaining decoded image information becomes long, which cannot cope with a speed required for the previewing. Also in using the preview function at a remote terminal, all pieces of coded information must be transferred to the remote terminal. That is, the above-mentioned problem in transfer cost and time remains unsolved, and therefore this method is not applicable.

As another method is known from Japanese Patent Laid-open No. 5-268480. FIG. 8 is a block diagram showing a coder intended to realize the preview function. Elements shown in FIG. 8 similar to those shown in FIG. 5 are denoted by the same reference numerals, and the explanation thereof will be omitted herein. In FIG. 8, there are shown a dividing section 71, high-frequency region transform coefficient 72, low-frequency region transform coefficient 72', quantizing section 73, high-frequency region quantized transform coefficient 74, low-frequency region quantized transform coefficient 74', entropy coding section 75, high-frequency region coded information 76, and low-frequency region coded information 76'. In this configuration shown in FIG. 8, prior to coding by the JPEG system mentioned above, a discrete cosine transform coefficient is divided into a high-frequency component and a low-frequency component (e.g., DC component only).

An input image 51 is divided into blocks each consisting of N×N pixels by a blocking section 52 to obtain blocked image information 53, and the blocked image information 53 is transformed into a transform coefficient 55 by a DCT section 54. The transform coefficient 55 is input into the dividing section 71, in which the transform coefficient 55 is divided into the high-frequency region transform coefficient 72 and the low-frequency region transform coefficient 72'. The high-frequency region transform coefficient 72 and the low-frequency region transform coefficient 72' are individually quantized by the quantizing section 73 to generate the high-frequency region quantized transform coefficient 74 and the low-frequency region quantized transform coefficient 74'. The high-frequency region quantized transform coefficient 74 and the low-frequency region quantized transform coefficient 74' are individually coded by the entropy coding section 75 to generate the high-frequency region coded information 76 and the low-frequency region coded information 76'.

The input image coded by using the configuration shown in FIG. 8 is stored in a database, for example. In retrieval from the database, only the low-frequency region coded information 76' is decoded to be displayed, thereby realizing the preview function. As the coded information used in previewing is only the low-frequency region coded information 76', the amount of data to be transferred is small to allow the construction of image information in a short time. Further, when a desired image is found in the previewing, the remaining high-frequency region coded information is also read to be decoded. However, such a configuration does not allow a coder/decoder in accordance with the JPEG system to be used as it is, and makes the format of the coded information different from the standard format. As a result, a special device is required and the compatibility is impaired.

SUMMARY OF THE INVENTION

It is accordingly an object of the present invention to provide an image information coding device which can output the approximation of image information at high speeds to confirm the contents of the image information coded, and can efficiently generate an image showing the approximation of the image information.

It is another object of the present invention to provide an image information communicating device having such an image information coding device and an image receiving device which can output the approximation of the image information at high speeds.

According to a first aspect of the present invention, there is provided an image information coding device comprising blocking means for dividing input image information into blocks each consisting of a given number of pixels to obtain blocked image information; image information coding means for coding the blocked image information obtained by the blocking means to obtain coded information and calculating an average of the blocked image information in each of the blocks to obtain a block average; and code amount control means for controlling the image information coding means so that an amount of the coded information obtained by the image information coding means becomes equal to or less than a preset value; wherein the image information coding means repeats coding of the blocked image information as updating a control parameter to be used in the coding under control by the code amount control means until the amount of the coded information becomes equal to or less than the preset value, and outputs the block average together with the coded information obtained in a final cycle of repetition of the coding.

In this image information coding device, the input image information is divided into blocks by the blocking means. The blocked image information obtained by the blocking means is coded by the image information coding means. In the coding process, the average of the blocked image information is calculated by the image information coding means. The coding by the image information coding means is controlled by the code amount control means so that the amount of the coded information obtained by the coding means becomes equal to or less than a preset value. The block average and the coded information obtained in the final cycle of repetition of the coding are output from the coding means. In this manner, the image information is coded in a usual coding format so that the amount of the coded information becomes equal to or less than the preset value. On the other hand, the block average output simultaneously with the coded information can be used for previewing. As the block average is small in data amount, information of the block average can be transferred at high speeds and a preview image can be generated at high speeds. Accordingly, the previewing can be effected at high speeds, and the amount of data to be transferred for the previewing even to a remote terminal can be reduced.

In the first aspect of the present invention described above, it is preferable that the image information coding means comprises discrete cosine transform means for performing discrete cosine transform of the blocked image information obtained by the blocking means to obtain a discrete cosine transform coefficient, block average calculating means for calculating the block average according to a DC component of the discrete cosine transform coefficient obtained by the discrete cosine transform means, quantizing means for quantizing the discrete cosine transform coefficient obtained by the discrete cosine transform means, and variable length coding means for performing variable length coding of the discrete cosine transform coefficient quantized by the quantizing means; and the code amount control means estimates a quantization step value for attaining a target code amount from a result of repeated coding with different quantization step values by the quantizing means and the variable length coding means, and applies the quantization step value estimated to the quantizing means.

In this image information coding means, the image information coding means has a configuration in accordance with the JPEG system to include the discrete cosine transform means, the quantizing means, and the variable length coding means. The quantization step value estimated by the code amount control means is applied to the quantizing means to control the coding means so as to attain the target code amount. Further, the block average is obtained according to the DC component of the discrete cosine transform coefficient obtained by the discrete cosine transform means. The block average can be obtained by extracting the DC component from all components of the discrete cosine transform coefficient output from the discrete cosine transform means and can be obtained during the repetition of coding by the coding means. Accordingly, the coding process can be efficiently performed. In this manner, the coded information formatted in accordance with the JPEG system can be obtained, and simultaneously the block average to be used for previewing can be obtained.

In the first aspect of the present invention described above, it is also preferable that the image information coding means comprises block average calculating means for calculating the block average, block average separating means for separating the block average calculated by the block average calculating means from the blocked image information obtained by the blocking means, quantizing means for quantizing the blocked image information separated from the block average by the block average separating means, and variable length coding means for performing variable length coding of the blocked image information quantized by the quantizing means; and the code amount control means estimates a quantization step value for attaining a target code amount from a result of repeated coding with different quantization step values by the quantizing means and the variable length coding means, and applies the quantization step value estimated to the quantizing means.

In this image information coding device, the image information coding means has a configuration including the block average calculating means, the block average separating means, the quantizing means, and the variable length coding means. The block average in each block is calculated by the block average calculating means, and the block average calculated above is then separated from the blocked image information obtained by the blocking means. Then, the blocked image information separated from the block average is quantized by the quantizing means, and the blocked image information quantized above is coded by the variable length coding means. The quantization step value estimated by the code amount control means is applied to the quantizing means to control the coding means so as to attain the target code amount. Further, the block average calculated by the block average calculating means is output from the device, so as to be used for previewing.

According to a second aspect of the present invention, there is provided an image information communicating device comprising an image information coding unit, a communication system, and an image receiving unit; the image information coding unit comprising blocking means for dividing input image information into blocks each consisting of a given number of pixels to obtain blocked image information; image information coding means for coding the blocked image information obtained by the blocking means to obtain coded information and calculating an average of the blocked image information in each of the blocks to obtain a block average; and code amount control means for controlling the image information coding means so that an amount of the coded information obtained by the image information coding means becomes equal to or less than a preset value; wherein the image information coding means repeats coding of the blocked image information as updating a control parameter to be used in the coding under control by the code amount control means until the amount of the coded information becomes equal to or less than the preset value, and outputs the block average and the coded information obtained in a final cycle of repetition of the coding together or selectively to the communication system; the image receiving unit comprising coded information receiving means for receiving the block average and the coded information from the communication system; and blocked image generating means for generating an image less in information amount than an original image by using the block average received by the coded information receiving means.

In this image information communicating device, the coded information and the block average are obtained by using the image information coding unit. When previewing is needed in the image receiving unit, the block average is transferred from the image information coding unit through the communication system to the image receiving unit. When the block average is received by the image receiving unit, a preview image is generated by the blocked image generating means to be shown to a user. As the information to be transferred at this time is only the block average less in data amount, data can be transferred at high speeds and at low costs, thus quickly obtaining the preview image. As the information amount of the block average transferred above is less than that of the coded information, the preview image to be generated is a rough-dots or reduced image.

As apparent from the above description of the present invention, not only the image information coded but also the information of the average of the image information in each block is generated to thereby enable quick generation of a preview image to be used for confirmation of the contents of the image information. Further, as the information of the block average can be generated during the coding process to be performed by the coding means, the coding process can be made efficient.

Other objects and features of the invention will be more fully understood from the following detailed description and appended claims when taken with the accompanying drawings.

BRIEF DESCRIPTION OF THE DRAWINGS

FIG. 5 is a block diagram showing the configuration of a coder in accordance with the JPEG system;

FIG. 6 is a block diagram showing a coder using a code amount control method in the related art;

FIG. 7 is a block diagram showing another coder using a code amount control method in the related art; and FIG. 8 is a block diagram showing a coder intended to realize a preview function.

DETAILED DESCRIPTION OF THE PREFERRED EMBODIMENTS

Figure 1:
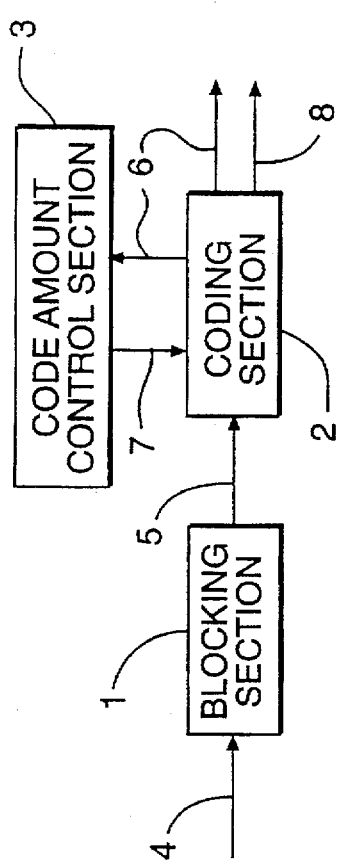
FIG. 1 is a block diagram showing a basic configuration of the image information coding device of the present invention.

FIG. 1 is a block diagram showing a basic configuration of the image information coding device of the present invention. In FIG. 1, there are shown a blocking section 1, coding section 2, code amount control section 3, input image information 4, blocked image information 5, coded information 6, coding parameter 7, and block average 8.

The blocking section 1 divides the input image information 4 into blocks each consisting of N×N pixels (N: positive integer). The coding section 2 codes the blocked image information 5 obtained by the blocking section 1 to generate the coded information 6. The coding section 2 also calculates the average of the image information 5 in each block (the block average 8) to output it together with the coded information 6. The code amount control section 3 receives the coded information 6 output from the coding section 2 to measure the amount of the coded information 6 and estimate the coding parameter 7 so that the amount of the coded information 6 reaches a preset target code amount. The code amount control section 3 then sends the estimated coding parameter 7 to the coding section 2 to control the operation of the coding section 2.

In operation, the input image information 4 is first divided into blocks each consisting of N×N pixels by the blocking section 1. Then, the blocked image information 5 obtained by the blocking section 1 is coded by the coding section 2. At this time, the coding parameter 7 to be used in the coding section 2 is estimated by the code amount control section 3, and the coding operation is repeated plural times in the coding section 2 until the target code amount is reached. Then, the coding parameter 7 attaining the target code amount is set in the coding section 2, and the final coding operation is performed with this coding parameter 7 set above to output the coded information 6 to the outside of the device.

During the coding process, the output of the coded information 6 to the outside of the device is performed only in the final cycle where the coding parameter 7 attaining the target code amount has been set to perform the final coding operation. Further, during the coding process, the block average 8 to be generated from the coding section 2 may be obtained at any cycle other than the final cycle. The output of the block average 8 to the outside of the device may be performed prior to or simultaneously with the output of the coded information 6 to the outside of the device.

Figure 2:
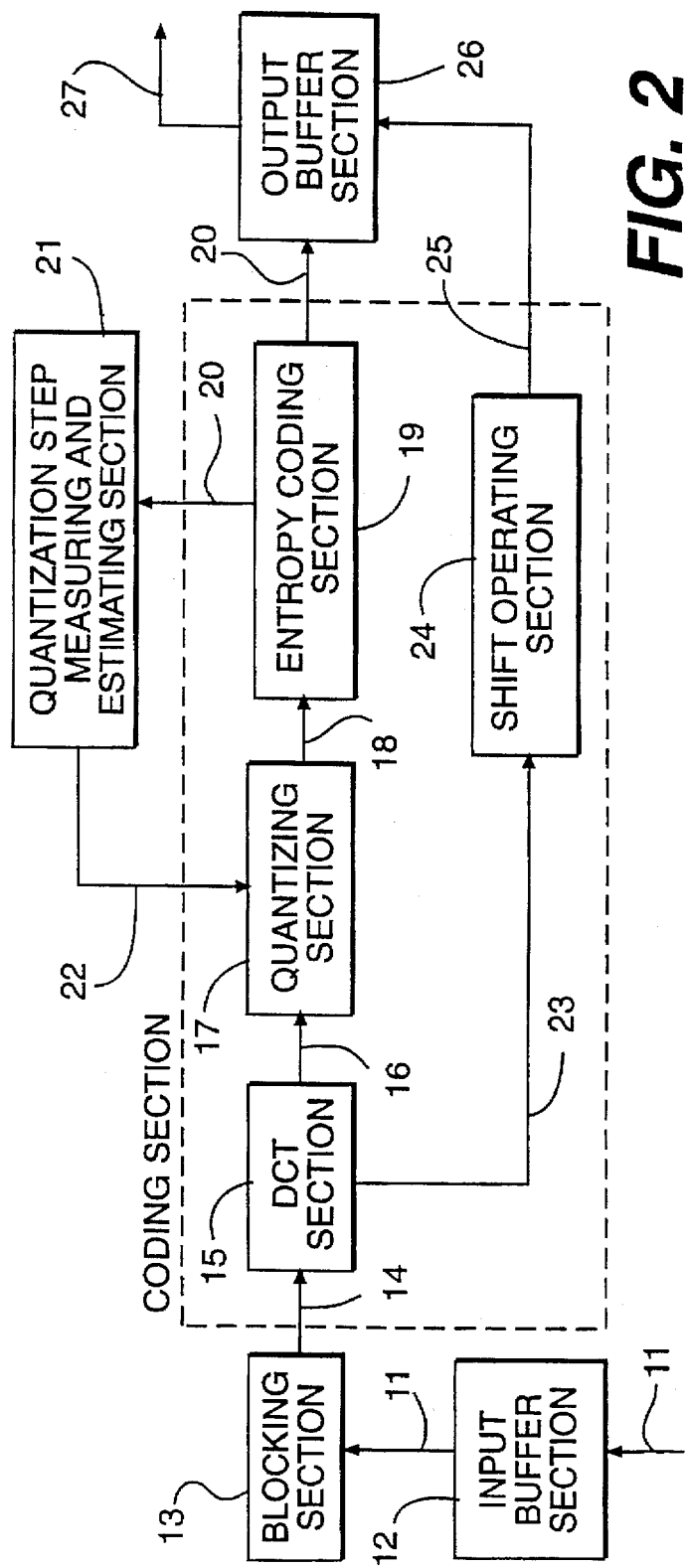
FIG. 2 is a block diagram showing a first preferred embodiment of the image information coding device of the present invention.

FIG. 2 is a block diagram showing a first preferred embodiment of the image information coding device of the present invention. In FIG. 2, there are shown input image information 11, input buffer section 12, blocking section 13, blocked image information 14, DCT section 15, transform coefficient 16, quantizing section 17, quantized transform coefficient 18, entropy coding section 19, coded information 20, quantization step measuring and estimating section 21, quantization step value 22, DC component transform coefficient 23, shift operating section 24, block average 25, output buffer section 26, and output information 27. In this preferred embodiment, the coding section 2 adopts the JPEG system, and employs a configuration similar to that shown in FIG. 7 such that no memory section is provided on the front stage of the quantizing section 17 and the input image 11 is read plural times from an external storage.

The input buffer section 12 is provided to absorb a difference in processing speed between the image information coding device of the present invention and the external storage, thus temporarily storing the input image information 11. The blocking section 13 corresponding to the blocking section 1 shown in FIG. 1 divides the input image information 11 into blocks each consisting of N×N pixels (N: positive integer). The DCT section 15 performs DCT of the blocked image information 14 in each block obtained by the blocking section 13 to provide the transform coefficient 16. A DC component of a discrete cosine transform coefficient obtained by the DCT section 15 is output as the DC component transform coefficient 23 from the DCT section 15 to the shift operating section 24. The DCT section 15 as the discrete cosine transform means first calculates the DC component of the discrete cosine transform coefficient in each block, and outputs it as the DC component transform coefficient 23 to the shift operating section 24 as the block average calculating means without awaiting the completion of calculation of all components of the discrete cosine transform coefficient in each block. The quantizing section 17 quantizes the transform coefficient 16 received from the DCT section 15. In performing final coding, the quantizing section 17 performs quantization of the transform coefficient 16 in accordance with the quantization step value 22 set by the quantization step measuring and estimating section 21. The entropy coding section 19 performs coding of the quantized transform coefficient 18 obtained by the quantizing section 17 to generate the coded information 20. The coded information 20 is sent to the quantization step measuring and estimating section 21, and the final coded information 20 is output to the output buffer section 26. The quantization step measuring and estimating section 21 corresponding to the code amount control section 3 shown in FIG. 1 measures a code amount on the basis of the coded information 20 received from the entropy coding section 19, and estimates a quantization step for attaining a preset target code amount from information of plural code amounts obtained from the coded information 20 with different quantization steps, then finally setting the quantization step value 22 into the quantizing section 17.

The shift operating section 24 receives the DC component transform coefficient 23 from the DCT section 15. As mentioned previously, the DC component transform coefficient 23 is several times the average in each block according to the size of each block, and the block average 25 is therefore calculated by the shift operating section 24. The output buffer section 26 temporarily stores the coded information 20 output from the entropy coding section 19 and the block average 25 output from the shift operating section 24, and outputs both as the output information 27.

In the above configuration, the input buffer section 12 and the output buffer section 26 may be omitted. For example, a memory may be provided on the front stage of the quantizing section 17. Further, the information to be sent from the entropy coding section 19 to the quantization step measuring and estimating section 21 may be code amount information rather than the coded information 20.

The operation of the first preferred embodiment will now be described. The input image information 11 is once input into the input buffer section 12, and is then divided into blocks in the blocking section 13 to obtain the blocked image information 14. The blocked image information 14 is subjected to DCT in the DCT section 15 to obtain the transform coefficient 16. The transform coefficient 16 is quantized in the quantizing section 17 to obtain the quantized transform coefficient 8. The quantized transform coefficient 18 is coded in the entropy coding section 19 to obtain the coded information 20. The coded information 20 is input into the quantization step measuring and estimating section 21, in which a code amount is measured on the basis of the coded information 20 and the quantization step value 22 is calculated to be set into the quantizing section 17.

The above coding process is repeated with the quantization step value 22 being updated per cycle of repetitions until the code amount of the coded information 20 reaches a target code amount. When the code amount reaches the target code amount, the coded information 20 is once output from the entropy coding section to the output buffer section 26, and is then output as the output information 27 from the output buffer section 26 to the outside of the device.

In the first stage of the coding process, the DC component transform coefficient 23 output from the DCT section 15 is input into the shift operating section 24, in which the DC component transform coefficient 23 is subjected to shift operation to obtain the block average 25. The block average 25 is once input into the output buffer section 26, and is then output as the coded information 27 to the outside of the device.

In this manner, the coded information with the code amount having reached the target code amount is obtained in accordance with the JPEG system, and the information of the block average is also obtained. The coded information and the block average information are stored in pairs into a database, for example. In retrieval from the database, a preview image can be constructed to be shown to a user by using the block average information. If the preview image retrieved is a desired image, the corresponding coded information may then be retrieved from the database and decoded.

Figure 3:
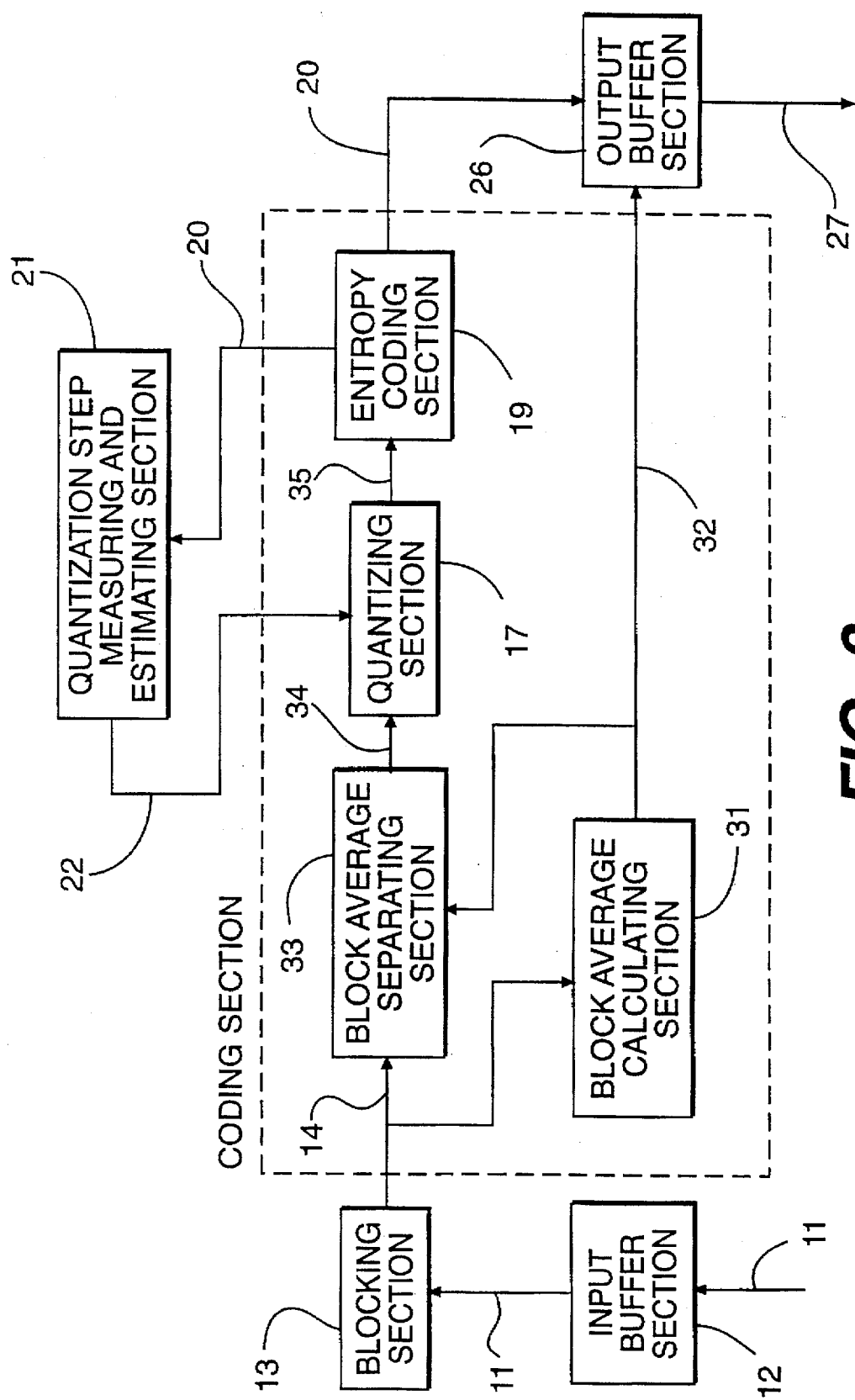
FIG. 3 is a block diagram showing a second preferred embodiment of the image information coding device of the present invention.

FIG. 3 is a block diagram showing a second preferred embodiment of the image information coding device of the present invention. Elements shown in FIG. 3 similar to those shown in FIG. 2 are denoted by the same reference numerals, and the explanation thereof will be omitted herein. In FIG. 3, there are shown a block image calculating section 31, block average 32, block average separating section 33, average separated, blocked image information 34, and quantized, average separated, blocked image information 35. In the second preferred embodiment, another method of the block coding is applied to the coding section 2 shown in FIG. 1. Also in this preferred embodiment, input image information 11 is read plural times from an external storage.

The block average calculating section 31 calculates the average of image information in each block obtained by dividing the input image information 11 in a blocking section 13. The average of image information in each block is input as the block average 32 into an output buffer section 26, and is then output as an output signal 27 to the outside of the device. The block average 32 calculated above is also input into the block average separating section 33. The block average separating section 33 separates the block average 33 from the image information in each block obtained by the blocking section 13. This separating process allows the image information in each block to become information of only relative errors from the average, thereby reducing the amount of information to be coded. A quantizing section 17 quantizes the average separated, blocked image information 34 obtained by the block average separating section 33, according to a quantization step value 22 set by a quantization step measuring and estimating section 21. An entropy coding section 19 codes the quantized, average separated, blocked image information 34 obtained by the quantizing section 17 and then outputs it as coded information 20 to the quantization step measuring and estimating section 21 or the output buffer section 26. The input buffer section 12, the blocking section 13, the quantization step measuring and estimating section 21, and the output buffer section 26 are all similar to the corresponding ones of the first preferred embodiment.

The operation of the second preferred embodiment will now be described. The input image information 11 is once input into the input buffer section 12, and is then divided into blocks by the blocking section 13 to obtain the blocked image information 14. The blocked image information 14 is input into the block average calculating section 31, in which the average—of the image information 14 in each block is calculated to obtain the block average 32. The blocked image information 14 is also input into the block average separating section 33, and the block average 32 output from the block average calculating section 31 is input into the block average separating section 33, in which the block average 32 is separated from the blocked image information 14 in each block to create the information of relative value to the block average 32, thereby obtaining the average separated, blocked image information 34. The average separated, blocked image information 34 is then quantized in the quantizing section 17 to obtain the quantized, average separated, blocked image information 35, which is in turn coded in the entropy coding section 19 to obtain the coded information 20. The coded information 20 is sent to the quantization step measuring and estimating section 21, in which the quantization step value 22 is calculated according to the coded information 20 and is set into the quantizing section 17.

The above coding process is repeated with the quantization step value 22 being updated until the amount of the coded information 20 reaches a target code amount. When the amount of the coded information 20 reaches the target code amount, the coded information 20 is input into the output buffer section 26, and is then output as the output information 27 from the output buffer section 26 to the outside of the device.

In the first stage of the coding process, the block average 32 output from the block average calculating section 31 is directly input into the output buffer section 26, and is then output as the output information 27 from the output buffer section 26 to the outside of the device.

In such a coding method, the average of the image information in each block is not included in the coded information. Therefore, in storing the coded information and the block average information into a database, the coded information is required to correspond to the block average information. In retrieval from the database, a preview image can be created to be shown to a user according to the block average information. Further, in obtaining a desired image, the coded information may be read from the database and decoded, and it may then be synthesized with the block average to create image information.

It should be understood that various coding methods other than those in the first and second preferred embodiments may be applied to the coding section 2.

Figure 4:
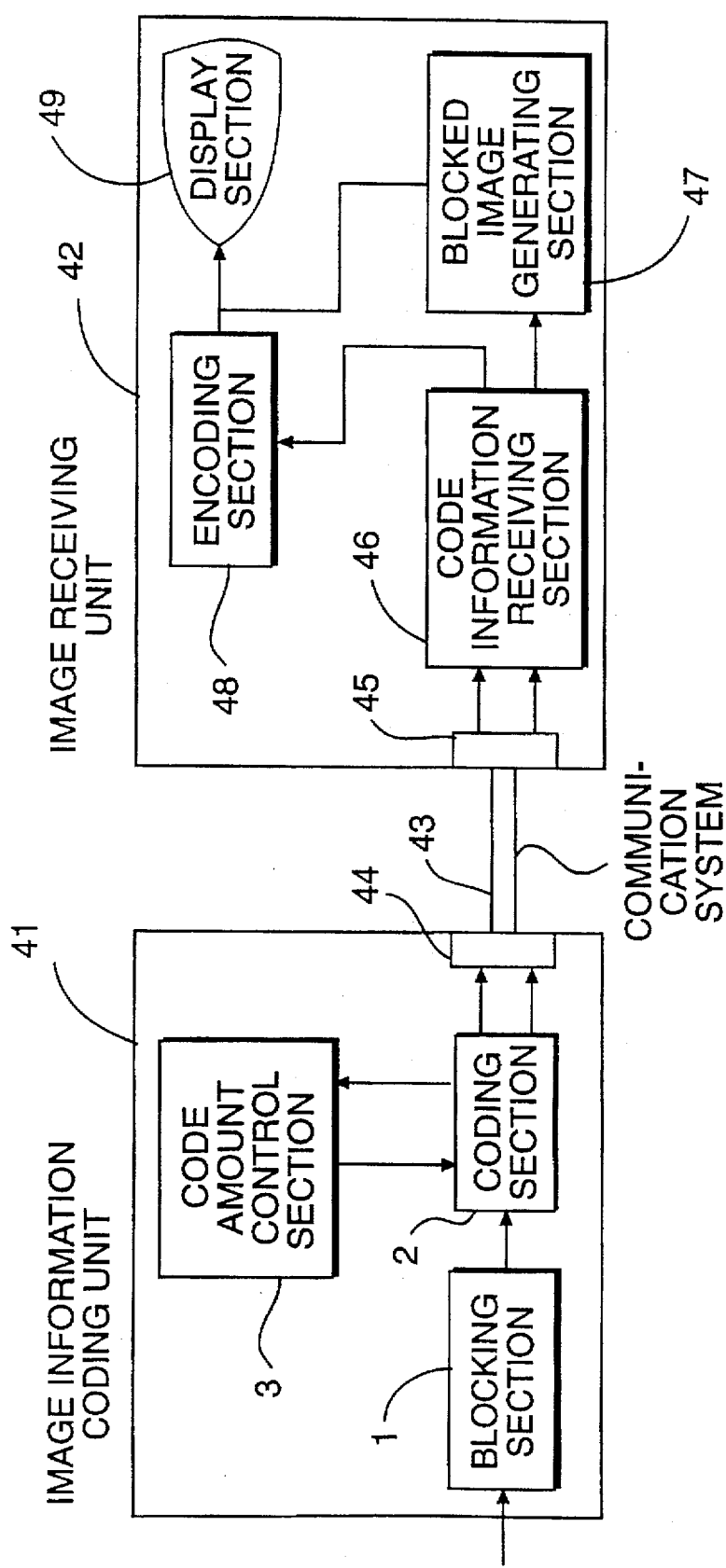
FIG. 4 is a block diagram showing a preferred embodiment of the image information communicating device of the present invention.

FIG. 4 is a block diagram showing a preferred embodiment of the image information communicating device of the present invention. In FIG. 4, there are shown an image information coding unit 41, image receiving unit 42, communication system 43, communication interfaces 44 and 45, coded information receiving section 46, blocked image generating section 47, decoding section 48, and display section 49. The image information coding unit 41 has a configuration similar to that shown in FIG. 1, and performs coding in accordance with the JPEG system as shown in FIG. 2 or block coding as shown in FIG. 3, for example. Coded information and block average information generated in the image information coding unit 41 are transmitted through the communication interface 44 to the communication system 43. The communication system 43 is a usual communication system such as a private line, public line, or LAN.

The image receiving unit 42 receives the coded information or the block average information transmitted from the communication system 43 to reconstruct an image. The image receiving unit 42 includes the communication interface 45, the coded information receiving section 46, the blocked image generating section 47, the decoding section 48, and the display section 49. The communication interface 45 performs interchange of information from the communication system 43. The coded information receiving section 46 receives the coded information and the block average information through the communication interface 45. The blocked image generating section 47 generates a preview image, for example, on the basis of the block average information received by the coded information receiving section 46. The image generated in the blocked image generating section 47 is a reduced image or a rough-dots image, for example, a mosaic image, because the image is generated on the basis of the block average information reduced in data amount. In the case where the display section 49 has a low resolution, the image generated on the basis of the block average information may become a display image. The decoding section 48 decodes the coded information received by the coded information receiving section 46 to generate image information. The method of decoding to performed by the decoding section 48 corresponds to the coding method adopted in the image information coding unit 41. The display section 49 displays the preview image, for example, generated in the blocked image generating section 47 or the image information generated in the decoding section 48. In addition to the display section 49, another output equipment such as a printer may be connected to output a printed image.

The operation of the preferred embodiment of the image information communicating device mentioned above will now be described. In the image information coding unit 41, the coded information and the block average information are generated by the operation mentioned above. The block average information is generated prior to the generation of the coded information. Accordingly, the block average information is first transmitted from the image information coding unit 41 through the communication interface 44 to the communication system 43. Then, the coded information receiving section 46 in the image receiving unit 42 receives the block average information through the communication interface 45. The coded information receiving section 46 sends the received block average information to the blocked image generating section 47. The blocked image generating section 47 generates a low-resolution image, for example, and allows it to be displayed by the display section 49.

After completion of the coding process in the image information coding unit 41, the coded information is transferred through the communication interface 44 to the communication system 43. Then, the coded information receiving section 46 in the image receiving unit 42 receives the coded information through the communication interface 45. The coded information receiving section 46 sends the received coded information to the decoding section 48. The decoding section 48 decodes the coded information and allows original image information to be displayed by the display section 49 in place of the low-resolution image generated by the blocked image generating section 47.

In this manner, the approximation of image information can be transmitted to a user at high speeds, and the image information according to the coded information can be subsequently displayed. According to such a configuration, the user is allowed to quickly know the approximation of the image information without waiting for low-speed decoding of the coded information, thereby improving the response to the request of the user.

In the case where image information is stored in its original form in a database or file and the user intends to know the approximation of the image information or know the approximation of the result of retrieval from the database, the user at a terminal including the image receiving unit 42 is allowed to request a host including the image information coding unit 41 to transfer the block average information. In response to this request, the image information stored in the database or file is input into the image information coding unit 41 and the block average information is transferred to the image receiving unit 42, thus allowing the approximation of the image information to be displayed by the display section 49. When the user refers to the approximation of the image information displayed by the display section 49 according to the block average information and determines that the image information is identical with desired information, the user at the terminal including the image receiving unit 42 is allowed to request the host including the image information coding unit 41 to transfer the coded information. In response to this request, the coded information is transferred from the image information coding unit 41 to the image receiving unit 42 and the desired image information is displayed by the display section 49.

In this manner, the block average information only is transferred in response to the request of the user intending to know the approximation of the image information, thereby allowing the user to refer to the approximation of the image information quickly at a low cost. Further, the coded information is thereafter transferred when the image information according to the block average information is identical with desired image information, thereby obtaining high-quality image information.

Generally, image information is stored in its coded form in a database. In this case, the image information coding unit 41 is used in coding the image information to be stored into the database. In retrieval from the database, the image information coding unit 41 is not used, but the coded information or the block average information retrieved from the database is directly transferred through the communication system 43 to the image receiving unit 42.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An image information coding device comprising:

blocking means for dividing input image information into blocks each consisting of a given number of pixels to obtain blocked image information;

image information coding means for coding said blocked image information obtained by said blocking means to obtain coded information and calculating an average of said blocked image information in each of said blocks to obtain an unencoded block average; and code amount control means for controlling said image information coding means so that an amount of said coded information obtained by said image information coding means become equal to or less than a preset value;

wherein said image information coding means repeats coding of said blocked image information as updating a control parameter to be used in said coding under control by said code amount control means until said amount of said coded information becomes equal to or less than said preset value, and outputs said unencoded block average together with said coded information obtained in a final cycle of repetition of said coding.

2. An image information coding device according to claim 1, wherein said image information coding means comprises discrete cosine transform means for performing discrete cosine transform of said blocked image information obtained by said blocking means to obtain a discrete cosine transform coefficient, block average calculating means for calculating said unencoded block average according to a DC component of said discrete cosine transform coefficient obtained by said discrete cosine transform means, quantizing means for quantizing said discrete cosine transform coefficient obtained by said discrete cosine transform means, and variable length coding means for performing variable length coding of said discrete cosine transform coefficient quantized by said quantizing means; and said code amount control means estimates a quantization step value for attaining a target code amount from a result of repeated coding with different quantization step values by said quantizing means and said variable length coding means, and applies said estimated quantization step value to said quantizing means.

3. An image information coding device according to claim 1, wherein said image information coding means comprises block average calculating means for calculating said unencoded block average, block average separating means for separating said unencoded block average calculated by said block average calculating means from said blocked image information obtained by said blocking means, quantizing means for quantizing said blocked image information separated from said unencoded block average by said block average separating means, and variable length coding means for performing variable length coding of said blocked image information quantized by said quantizing means; and said code amount control means estimates a quantization step value for attaining a target code amount from a result of repeated coding with different quantization step values by said quantizing means and said variable length coding means, and applies said estimated quantization step value to said quantizing means.

4. An image information communicating device comprising an image information coding unit, a communication system, and an image receiving unit;

said image information coding unit comprising blocking means for dividing input image information into blocks each consisting of a given number of pixels to obtain blocked image information; image information coding means for coding said blocked image information obtained by said blocking means to obtain coded information and calculating an average of said blocked image information in each of said blocks to obtain an unencoded block average; and code amount control means for controlling said image information coding means so that an amount of said coded information obtained by said image information coding means becomes equal to or less than a preset value; wherein said image information coding means repeats coding of said blocked image information as updating a control parameter to be used in said coding under control by said code amount control means until said amount of said coded information becomes equal to or less than said preset value, and outputs said unencoded block average and said coded information obtained in a final cycle of repetition of said coding together or selectively to said communication system;

said image receiving unit comprising coded information receiving means for receiving said unencoded block average and said coded information from said communication system; and blocked image generating means for generating an image less in information amount than an original image by using said unencoded block average received by said coded information receiving means.

* * * * *